(12) United States Patent
Rich

(10) Patent No.: US 9,000,059 B2
(45) Date of Patent: Apr. 7, 2015

(54) HEAT MOLDABLE GEL AND FOAM COMPOSITION

(75) Inventor: Jeffrey S. Rich, Forest Hills, NY (US)

(73) Assignee: Masterfit Enterprises, Inc., Briarcliff Manor, NY (US)

( * ) Notice: Subject to any disclaimer, the term of this patent is extended or adjusted under 35 U.S.C. 154(b) by 507 days.

(21) Appl. No.: 13/350,327

(22) Filed: Jan. 13, 2012

(65) Prior Publication Data

US 2013/0184374 A1     Jul. 18, 2013

(51) Int. Cl.
*C08J 9/35*     (2006.01)
*C08J 9/40*     (2006.01)

(52) U.S. Cl.
CPC .............. *C08J 9/405* (2013.01); *C08J 2467/04* (2013.01); *C08J 2425/10* (2013.01)

(58) Field of Classification Search
CPC ..... C08J 9/405; C08J 2425/10; C08J 2467/04
USPC ................ 521/53–55; 523/167; 524/500, 502
See application file for complete search history.

(56) References Cited

U.S. PATENT DOCUMENTS

| 3,867,324 | A | | 2/1975 | Clendinning et al. | |
|---|---|---|---|---|---|
| 3,894,165 | A | * | 7/1975 | Bates | 427/244 |
| 4,419,261 | A | * | 12/1983 | Takahashi | 428/71 |
| 4,957,798 | A | * | 9/1990 | Bogdany | 428/95 |
| 6,025,414 | A | | 2/2000 | Rich | |
| 7,900,380 | B2 | | 3/2011 | Rich | |
| 2008/0280126 | A1 | * | 11/2008 | Lenz et al. | 428/319.3 |
| 2013/0296449 | A1 | * | 11/2013 | Peterson et al. | 521/122 |

FOREIGN PATENT DOCUMENTS

| EP | 2397513 | * | 12/2011 |
|---|---|---|---|
| GB | 1188594 | * | 4/1970 |
| JP | 63-117045 | * | 5/1988 |

* cited by examiner

*Primary Examiner* — Irina S Zemel
(74) *Attorney, Agent, or Firm* — McGlew and Tuttle, P.C.

(57) ABSTRACT

The present invention is directed to a novel heat moldable gel and foam composition and the process for making the gel and foam composition. The gel and foam composition comprises gel infused into cells of a foam. The gel is a blend of gelling agents, such as thermoplastic polymers, resiliency components, such as styrene-butadiene or styrene-isoprene copolymer and softening agents, such as oils. The foam preferably has a hardness less than or equal to a hardness of the gel.

21 Claims, 5 Drawing Sheets

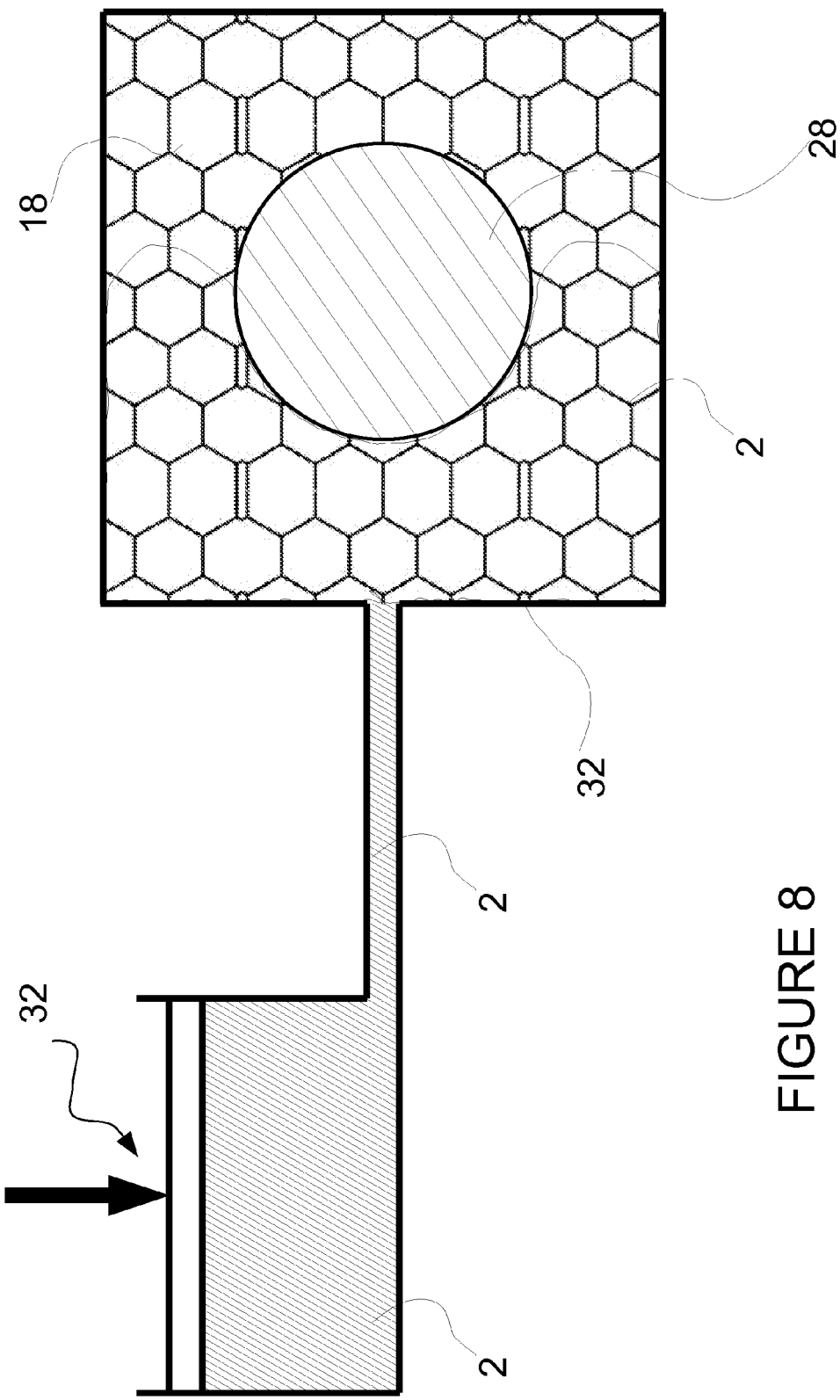

HEAT MOLDABLE GEL AND FOAM COMPOSITION

FIELD OF THE INVENTION

The present invention relates to the field of padding or cushioning that is custom fitted to a part to be protected, and in particular to padding or cushioning that is custom fitted at one temperature and provides the padding or cushioning at another temperature.

BACKGROUND OF THE INVENTION

There is a multitude of products which are designed to conform to individual body parts. Examples of these products include chair seats, shoes and pillows, sporting equipment such as helmets, boots, and protective gear, and products for medical uses such as casts, braces and orthotics.

The purpose of these products is generally to provide the benefits of comfort, support, protection and shock absorption to the user. These products can be generic or, more preferably, can be customized to fit a particular individual's body part. With respect to customizable products, most can be fitted once, are not remoldable, and are usually very expensive.

In an effort to provide a low cost custom fitting athletic shoe, Reebok has introduced the Pump™. The Pump™ offers a customized fit by utilizing air bladders in conjunction with an air pump. The air bladders are deposed at selected locations on the interior of the shoe. The wearer can then activate the pump, thereby filling the bladders with pressurized air. This inflation allows the shoe to better conform to the shape of the wearer's foot. However, the drawback of this design is that the air bladders need to be inflated before and/or during each use. Further, this design does not offer significant shock absorption or protection.

Other athletic shoes on the market contain inserts of air or gel at various selected locations on the interior of the shoe so as to provide support and/or shock absorption. However, these inserts do not provide a customized fit. Additionally, in the case of the air inserts, the air tends to move from side to side during use, thereby reducing its motion control and effectiveness. Also, all of these products tend to wear out over time and become less effective.

Salomon of France has introduced a heat moldable removable inner boot with ethyl vinyl acetate (EVA) padding. The inner boot is placed over forced hat air blowers known as heat stacks that force hot air up into the liner, much like a heat gun. After the boot is warmed, the skier puts the boots on for a custom fit. While Salomon inner boot is an improvement from the products of the past, its possesses a number of draw backs. EVA offers limited shock offers limited shock absorption; it is too soft for heavier or advanced skiers; the temperature at which it must be molded, 120.degree. C., is too hot to be allowed to come into direct contact with the individuals skin whose body temperature is 37.degree. C.; it is not reusable more than five times; it is difficult to fit and therefore must be applied by a professional.

In an effort to achieve a custom fit, foams, silicone foams and silicones have been used for more than twenty years with mixed success. They are generally expensive, difficult to use and may generate hazardous fumes. These products must be fitted by a professional sales person and can only be fitted once. Additionally, since these products are not remoldable and can not be reused, if an error is made in the fitting process, the product must be discarded and the process restarted. Also, most of these products eventually break down and soften after a few months of use.

Applicant's U.S. Pat. No. 6,025,414 describes a composite which can be used to provide custom padding, cushioning and/or even constant support to a unique shaped part, and is heat moldable. This composite can be relatively heavy in some applications, and the composite has a tendency to slowly flow at the temperatures at which the composite is to provide the cushioning and support. The composite also can have relatively very high adhesion or be very sticky. This tendency to flow and the stickiness, often requires that the composite be contained in an enclosure such as a pouch or envelope. U.S. Pat. No. 6,025,414 is incorporated by reference.

Applicant's U.S. Pat. No. 7,900,380 discloses a user moldable and adjustable insert where the amount of gel in a chamber is selectively variable depending on the needs of a user. U.S. Pat. No. 7,900,380 is incorporated by reference.

SUMMARY OF THE INVENTION

Unlike the above-described products, the composition of the present invention is firm enough to offer support and shock-absorption, while maintaining enough flexibility to allow comfortable use through conformation to the user's body part. Additionally, unlike other molded products, the compositions of the present invention do not compress or degrade over time. The present invention furthermore is lighter, flows less and is less sticky than the composite of Applicant's U.S. Pat. No. 6,025,414.

This invention is directed to a novel heat moldable polymeric composition comprising a blend of a gelling agent, such as a thermoplastic polymer, a resiliency component, such as styrene-butadiene copolymer, styrene-isoprene copolymer or other resilient amphorous polymer and a softening agent, such as oils. This composition is combined to form a gel much in the same way as U.S. Pat. No. 6,025,414.

The gel is arranged in a solid foam having a plurality of at least partially hollow cells. The foam being solid enough to support its own structure without flowing under its own weight. The gel being arranged inside the plurality of cells.

The foam, the gelling agent, the resiliency component and the softening agent are chosen to be of a type, and to be of a quantity, to cause the composition to have a hardness greater than 16 on a Type "OO" scale durometer and less than 45 on a Type "A" scale durometer and can be softened to a hardness of less than 2 on a Type "OO" scale durometer by heating to a temperature of 50 degree C. Preferably the gel is formed to have the above hardness, and the foam has a hardness that is less than, or equal to, the above described hardness. However the foam can have a hardness greater than 16 on a Type "OO" scale durometer and less than 45 on a Type "A" scale durometer.

The foam can be an open cell foam with a cell size greater than, or equal to, 100 microns, and less than, or equal to, ¼ of an inch, with the cell size preferably being greater than, or equal to, ¹⁄₆₄th of an inch, and less than, or equal to, ¹⁄₁₆ of an inch.

In an alternative, the foam can be a closed cell foam with a cell size greater than, or equal to, ¹⁄₆₄th of an inch, and less than, or equal to, ½ of an inch. When the gel is arranged in the cells after the cells are closed, the foam is perforated with holes. The holes can be of any shape including complete circles, diamond, oval or square shapes. Applicant has found that it is beneficial when the perforations are of a size range substantially equal to the cell size range of the foam. In particular perforations greater than, or equal to, ¹⁄₆₄th of an inch, and less than, or equal to, ½ of an inch. The preferred size of the cells is greater than, or equal to, ¹⁄₆₄th of an inch, and less than, or equal to, 1/16 of an inch, with the foam being perforated with holes substantially equal to the cell size.

In order to give the gel the above hardness, the gel preferably includes 33.3% by weight of the gelling agent, 33.3% by weight of the resiliency component and 33.3% by weight of the softening agent. These ratios have been found to be especially effective when the gelling agent is a thermoplastic polymer, the resiliency component is styrene-butadiene copolymer, and the softening agent is oil.

Preferable thermoplastic polymers include biodegradable polymers, for example, poly (epsilon-caprolactone), also known as polycaprolactone. Additives such as glycerine monostearate may also be used as a substitute for, or in addition to, the thermoplastic polymers.

It is preferable to infuse the foam with the gel by first combining the gelling agent, the resiliency component and the softening agent together to first form the gel. The actual infusing can then be performed by arranging the gel over the foam, and heating the gel and the foam, to cause the foam to absorb the gel. The infusing can also be performed by arranging the gel between two layers of the foam to form a sandwich type arrangement. The infusing is then accomplished by compressing the sandwich type arrangement between two rollers to force the gel into the foam. This infusing can include heating the sandwich type arrangement, especially by heating the two rollers. The heating of the sandwich type arrangement can also be caused by friction and compression from the rollers.

Another way of infusing the gel into the foam, is to use gas pressure to force the gel inside the plurality of cells. This can be done in a negative manner, such as applying a vacuum to one side of the foam, and have the gel arranged on the other side. Correspondingly the gas pressure infusion can be done in a positive manner with the gas pressure pressing against the gel which then presses against the foam.

Still another way of infusing the gel into the foam, is to use the user's own pressure when the user wears or operates equipment. The equipment is initially manufactured with the gel being separate from the foam. The gel is preferably placed adjacent the foam. When the user wears or operates the equipment, such as putting on the shoe for the first time, the pressure of the user against the equipment forces the gel into the foam. Since the gel and foam are to cushion the user, the gel/foam absorbs force. This force can be used to force the gel into the foam. The gel can also be placed in a shoe, or article to be worn, between one or two layers of foam, and when worn the gel will infuse into the foam. In an alternative method, one can use heat stacks or forced hot air blowers to force the gel into the foam for an immediate custom fit.

It is also possible to infuse the gel into the foam during the initial fitting of the article or piece of equipment. For example, a shoe is originally made with all the parts, except for the gel. The foam portions are already in the shoe. The user puts the shoe on, and then the liquid gel is injected into the foam portions of the shoe. The force of the injection pushes the gel into the foam, and also allows the gel to be custom fit to the user's body part.

In accordance with the uses of the present invention, an athletic shoe can be equipped with customized inserts which contain the inventive gel and foam composition. These inserts can be placed at the tongue of the shoe, at the heel and/or upon all or some of the length of the insole. An insole containing the inventive composition would be firm enough to provide customized support at the arch and heel, thereby helping to prevent pronation caused by knee injuries, yet soft enough to absorb much of the shock and strain associated with running or other sports.

Another useful application of the inventive composition is in the medical field for custom-shaped articles, such as inserts for limb braces and the like. Limb brace inserts normally need to be regularly recast to account for changes in the patient's condition, such as swelling.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 8 is a cross sectional view of the shaping and molding of the gel using the gel under pressure.

DESCRIPTION OF THE PREFERRED EMBODIMENTS

Figure 1:
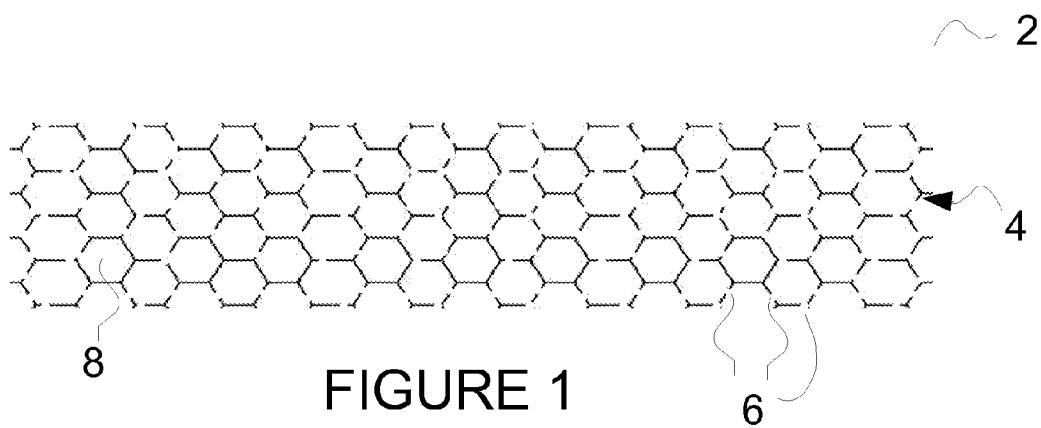
FIG. 1 is a partial cross sectional view of the gel, and of the open cell foam, arranged one on top of the other.

Referring to the drawings in particular, FIG. 1 shows the gel 2 already formed and arranged on top of the open cell foam 4. The open cell foam 4 has a plurality of cells 8 and naturally occurring openings 6 between the cells.

When the arrangement shown in FIG. 1 is heated, the gel 2 softens, and the gel 2 flows into the foam 4, through the openings 6, and into the cells 8. The resulting composition 10, of the gel infused into the foam, is shown in FIG. 2.

Figure 2:
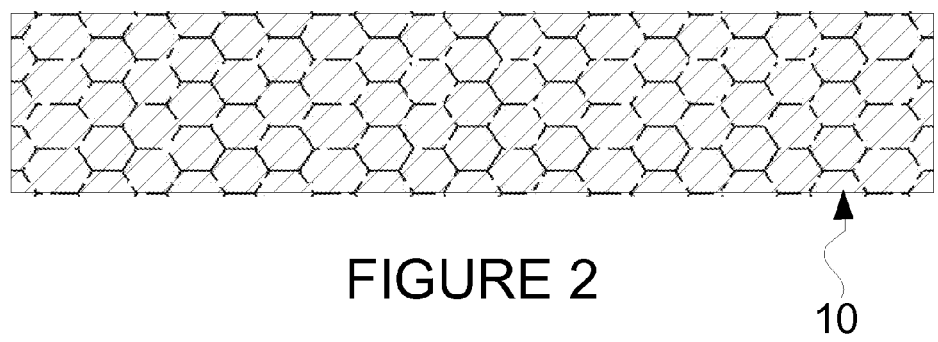
FIG. 2 is a partial cross sectional view of the gel and the open cell foam with the gel infused into the open cell foam.
Figure 3:
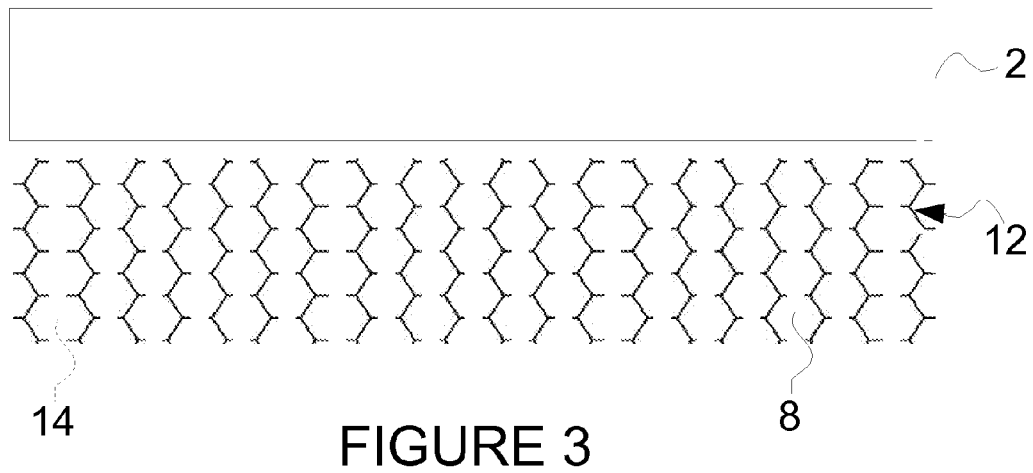
FIG. 3 is a partial cross sectional view of the gel, and of the perforated closed cell foam, arranged one on top of the other.
Figure 4:
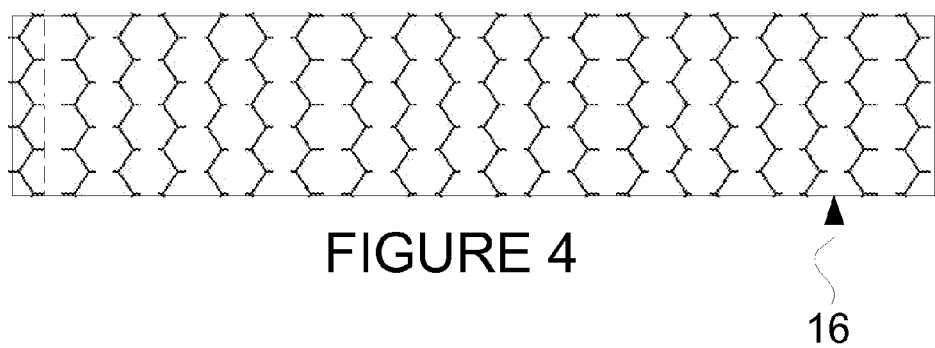
FIG. 4 is a partial cross sectional view of the gel and the perforated closed cell foam with the gel infused into the perforated closed cell foam.

The embodiment of FIGS. 3 and 4 are similar to the embodiment of FIGS. 1 and 2, except that a closed cell foam 12 is used. Prior to the infusion of the gel 2, perforations 14 are made in the closed cell foam 12. These perforations are preferably in the same size range as the size range of the cells. In the drawings, the perforations 14 have been shown to be smaller than the cell size in order to better distinguish the perforations from the cells. The resulting composition 16 is shown in FIG. 4.

Figure 5:
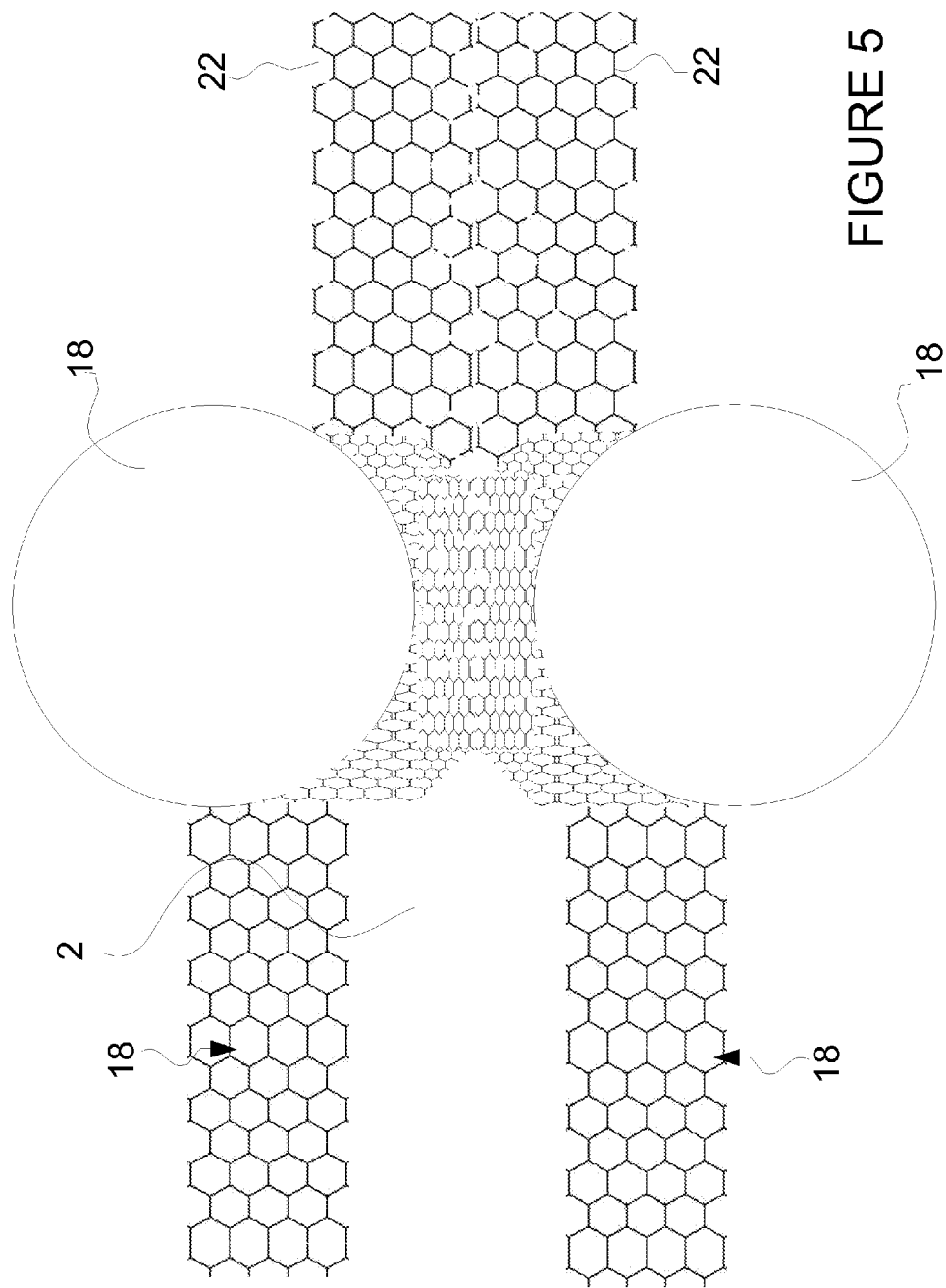
FIG. 5 is a partial cross sectional view of the foam-gel-foam sandwich being passed between two rollers to infuse the gel into the foam.

FIG. 5 shows a process of infusing the gel using rollers 20. The gel 2 is placed between two layers of the foam 18. The foam 18 can be either open cell or closed cell foam with perforations. The foam 18 is shown generically without either openings or perforations, but is understood to have either one. The gel 2 and the two foam layers 18 form a sandwich arrangement on the left side of the rollers 20 in FIG. 5. This sandwich arrangement is passed between the rollers 20 which compresses the foam 18 and the gel together, forcing the gel 2 into the foam 18. This process can be assisted by also heating the sandwich arrangement, such as in an oven, heating the rollers 20, or using the friction and compression of the rollers to heat the gel 2, and have the gel 2 flow more easily into the foam 18. Downstream of the rollers 20, the gel and foam composition 22 is produced with two layers of foam in the gel and foam composition.

Another similar possibility is to place the gel between two layers of foam, and to place the separate foam-gel-foam arrangement in the product that is to have the padding or cushioning, such as a shoe, helmet or other gear. The product is then used in a manner similar to its intended use, such as by wearing the shoe, helmet or gear. This uses then forces the gel into the foam to create the gel and foam composition. This allows the gel and foam composition to be custom fit. The forcing of the gel into the foam, and the custom fitting, can be enhanced by heating the separate foam-gel-foam arrangement in a product prior to using the product for the first time to create the gel and foam composition. The foam-gel-foam arrangement is beneficial since the arrangement does not need a separate container. For example, the separate foam-gel-foam arrangement can be placed in the shell of a shoe, boot or helmet. The separate foam-gel-foam arrangement can then be heated with forced hot air blowers. The foot can then be placed in the shoe or boot so that the gel is forced into the foam, and fills voids between the foot and the shell. The soft gel flows into the foam much faster with the pre-heating and forms a custom fit within minutes. If the gel is not preheated, the gel is forced into the foam from body heat and pressure which can take over an hour depending on the temperature and pressure. In areas where the foam is heavily compressed, there is not much space in the foam, and the gel only fills those spaces in the foam. Excess gel is forced into other areas that are not as heavily compressed. This provides the custom fitting.

Figure 6:
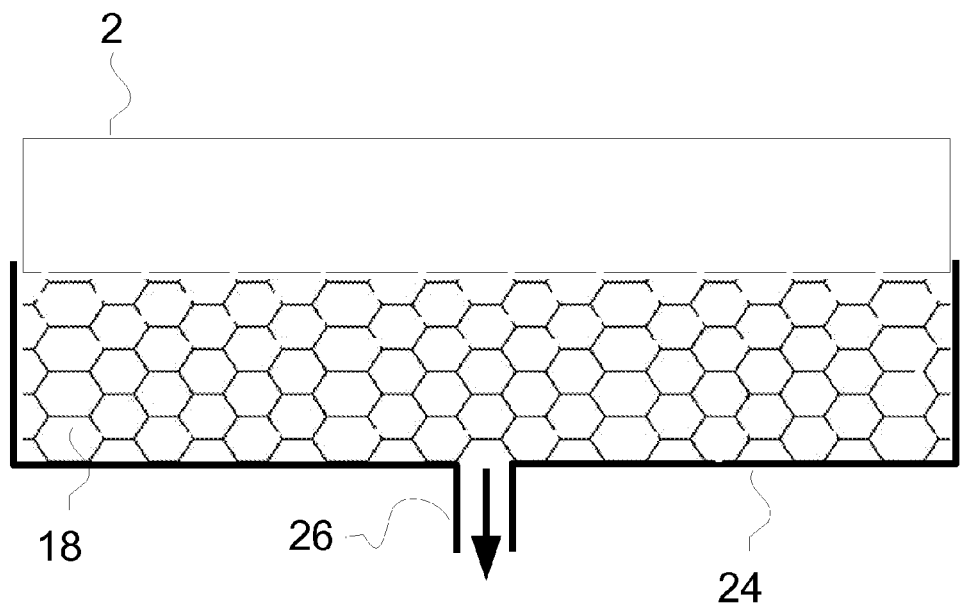
FIG. 6 is a partial cross sectional view of the gel and the foam arranged one on top of the other before using gas pressure to infuse the gel into the foam.
Figure 7:
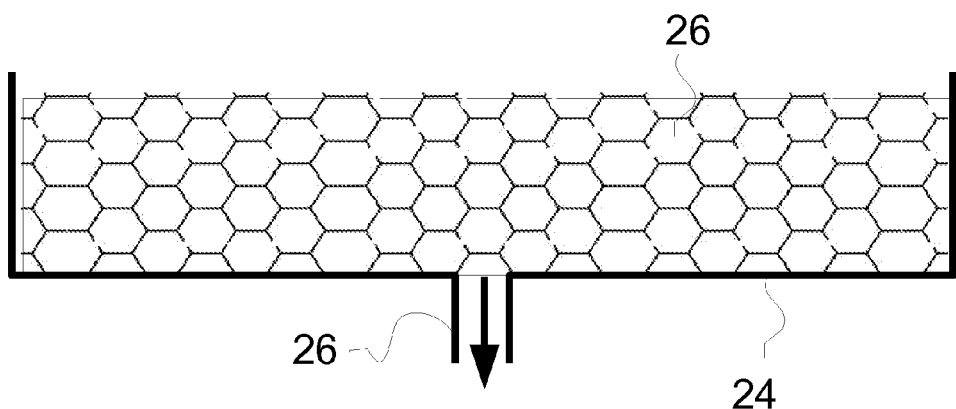
FIG. 7 is a partial cross sectional view of the gel and the foam arranged one on top of the other after using gas pressure to infuse the gel into the foam.

FIGS. 6 and 7 show infusing the gel 2 into foam 18 by using gas pressure. The foam 18 can either be open cell foam or closed cell foam with perforations. The foam 18 is placed in a chamber 24. The gel 2 is placed on one side of the foam 18. In the embodiment of FIGS. 6 and 7, gas is evacuated from the chamber 24 through the port 26. This forces the gel 2 into the foam 18 resulting in the gel and foam composition 26.

The gel 2 comprises blends of gelling agents, resiliency components and softening agents. The gelling agents provide rigidity to the composition. Suitable gelling agents are thermoplastic polymers. Preferably, the thermoplastic polymer is environmentally safe and can be heated by microwave.

In a preferred embodiment of the present invention, the thermoplastic polymer is polycaprolactone. The melting point of polycaprolactone is 60 degrees. C. The density at 23 degrees C. is 1.145 g/cc. U.S. Pat. No. 3,867,324 discloses novel polymeric blends incorporating biodegradable thermoplastic polymers such as poly (epsilon-caprolactone) or the like, useful in the present invention, and is incorporated by reference.

Suitable gelling agents may include, but are not limited to, polyethylene, polypropylene, polybutene-1, poly(tetramethylene oxide), and poly(oxypropylene). Block copolymers such as poly(styrene-b-butadiene), and poly(styrene-b-isoprene) may also be used.

Preferably, the resiliency component has a high molecular weight, greater than 500,000, a solubility parameter similar to styrene-butadiene or styrene-isoprene copolymer, a low glass point, and a low melting point. Suitable resiliency components may include, but are not limited to, polyethylene (branched), polyisobutylene, poly(isobutylacrylate), poly (butylacrylate) poly(butylmethacrylate), poly(isobutylmethacrylate) poly(1,4 cis butadiene), poly(chloroprene), poly(tetramethylene oxide) or amorphous copolymers such as polypropylene (EPR rubber) poly(chlorotrifluoroethylene-co-vinyline chloride), poly(styrene-co-butadiene), and poly(ethylene-co-vinylacetate).

Preferably, the solubility parameters of the softening agents should be near that of the resiliency agent and boiling points above 200 degrees C. Additionally, suitable softening agents are non-toxic, have no smell and provide for a final product with little tack. In accordance with a preferred embodiment, the softening agent is mineral oil. Suitable softening agents may include, but are not limited to, dodecane, diamylphthalate, dibutylsebacate, diisodecylphthalate, dioctyladipate, dioctyl phthalate, dioctylsebacate, ethylbenzoate, tricresyl phosphate, turpentine, pine oil, propyl butyrate, Solvesso 150 and terpene.

Each ingredient contributes a different characteristic to the final product. For example, when a higher proportion of thermoplastic polymer is utilized, the end product will be harder. When a higher proportion of softening agent is utilized, the final product will be more malleable or gel-like. When the proportion of resiliency component is increased, the final material will be more flexible. A drawback of increasing the amount of resiliency component is that the molding temperature will be higher. Glycerine monostearate can be substituted for plastic, however, too much glycerine monostearate results in a product that is too soft and molds at room temperature. It is appreciated that a person of ordinary skill in the art can adjust the ratio of ingredients to attain a gel 2 with the desired qualities.

Additives such as glycerine monostearate may also be used as a substitute for or in addition to the thermoplastic polymers. The gels 2 made from the blends can range from a soft gel-like material to a hard, rubbery plastic. Throughout this range, the gels 2 are able to absorb shock and provide support.

The gels have melting points and molding temperatures sufficiently low so that they may be heated and made moldable in a conventional manner such as in a microwave or convection oven, or with a heat gun. Microwave ovens are particularly useful for heating and softening the composition for fitting, because it can be accomplished generally without boiling water, though boiling water can be used. A conventional oven may also be used. Additionally, wire filaments may be placed into the inventive composition. When an electrical current is applied to the wire filaments the resulting heat will soften the composition. The inventive composition can be refitted and reused by simply reheating.

The gel 2 can be made in various durometers. The firmer the gel, the higher the melting temperature. The preferred melting temperature range is 125 to 160 degrees Fahrenheit (50 to 72 degrees C.). Gel and foam formulas that are softer with the lower heating temperature of under 140 degrees Fahrenheit (60 degrees C.) are also auto moldable. When the gel 2 is heated to a substantially liquid state above 140 degrees Fahrenheit the gel viscosity is at a level where molding can be achieved. The preferred gel gets soft and moldable at 125 degrees Fahrenheit. At this temperature it has the consistency of room temperature cream cheese. At 140 degrees Fahrenheit the preferred gel 2 is like room temperature butter. At 160 degrees Fahrenheit the preferred gel 2 is like molasses. At 250 degrees Fahrenheit (121 degrees C.) the preferred gel 2 flows.

Skin burns during the molding process are avoided because of the low molding temperature of the gel 2 in the gel and foam composition. Further, the gel and foam composition's low molding temperature allows the insert to be held against the desired body part. A sock lining can also be used to further protect sensitive areas from excess heat. The gel and foam composition may then be molded to the desired shape, such as to conform to a body part, and then set upped quickly at room temperature. Once the composition is heated, the user has approximately 2 to 3 minutes to mold and/or shape it.

Shaping and/molding of the composition is easily accomplished. Pockets or pieces containing the heated gel and foam composition can be inserted in or attached to any item with which it will be used. The user can then wear, sit-on or put-on the item, and conform the gel and foam composition to the given body part. The gel and foam composition completely sets up in about five to ten minutes depending on the volume of the composition, and is ready for use. It is appreciated that the term "sets up" defines a non-chemical transition from a pliable material to a rigid material.

FIG. 8 shows another way to shape and/or mold the gel/foam composition. The object 28 to be cushioned is surrounded with the foam 18, which is then put in a container 30. The gel 2 is then placed under pressure in a compressor 32 and forced into the foam 18 to surround the object 28. In this way the gel 2 is custom molded to the shape of the object 28. In one preferred embodiment, the object 28 is the foot of a user, the container 30 is a shoe and the foam 18 is arranged between the foot and the shoe. Since the foam is compressible, it easily conforms to the shape of the foot, and then the gel can be infused into the foam to also have the shape of the foot.

It is appreciated that fillers, such as hollow spheres, may be added to the gel and foam composition without significantly effecting the above-noted characteristics of the composition. This advantageously permits the volume of the gel to be increased without significantly increasing the weight of the gel. The volume of the gel may be increased by 25% with the fillers without significantly affecting the him characteristics of the composition. Suitable filler material may include, but is not limited to, glass beads, microballoons, glass bubbles, cork, phenolic balloons and 3M Scotchlite Glass Bubbles.

It is also contemplated that colors and/or scents can be added to the inventive compositions to achieve desired effects.

While specific embodiments of the invention have been shown and described in detail to illustrate the application of the principles of the invention, it will be understood that the invention may be embodied otherwise without departing from such principles.

What is claimed is:

1. A heat moldable composition comprising:
    a solid foam having a plurality of cells, said plurality of cells being at least partially hollow, said foam having a hardness greater than 16 on a Type "OO" scale durometer and less than 45 on a Type "A" scale durometer;
    a gelling agent for imparting rigidity to said composition, said gelling agent being a thermoplastic polymer;
    a resiliency component for imparting rubber-like resilient characteristics to said composition, said resiliency component being styrene-butadiene copolymer;
    a softening agent for controlling flowability of said composition, said softening agent being oil;
    said gelling agent, said resiliency component and said softening agent being mixed together to form a gel, said gel being arranged inside said plurality of cells of said foam to form the composition;
    said foam, said gelling agent, said resiliency component and said softening agent being chosen to be of a type, and to be of a quantity, to cause the composition to have a hardness greater than 16 on a Type "OO" scale durometer and less than 45 on a Type "A" scale durometer and to soften to a hardness of less than 2 on a Type "OO" scale durometer at a temperature of 50 degree C.

2. A heat moldable composition in accordance with claim 1, wherein:
    said foam is an open cell foam with a cell size greater than or equal to 100 microns, and less than or equal to ¼ of an inch.

3. A heat moldable composition in accordance with claim 1, wherein:
    said foam is an open cell foam with a cell size greater than or equal to 1/64th of an inch, and less than or equal to 1/16 of an inch.

4. A heat moldable composition in accordance with claim 1, wherein:
    said foam is a closed cell foam with a cell size greater than or equal to 1/64th of an inch, and less than or equal to ½ of an inch, said foam being perforated with holes of a size greater than or equal to 1/64th of an inch, and less than or equal to ½ of an inch.

5. A heat moldable composition in accordance with claim 1, wherein:
    said foam is a closed cell foam with a cell size greater than or equal to 1/64th of an inch, and less than or equal to 1/16 of an inch, said foam being perforated with holes substantially equal to said cell size.

6. A heat moldable composition in accordance with claim 1, wherein:
    said gelling agent, said resiliency component and said softening agent are chosen to be of a type and to be of a quantity to cause the composition to have a hardness greater than 16 on a Type "OO" scale durometer and less than 45 on a Type "A" scale durometer and can be softened to a hardness of less than 2 on a Type "OO" scale durometer by heating to a temperature of 50 degree C.;
    said foam has a hardness less than or equal to said hardness of said gel.

7. A heat moldable composition in accordance with claim 1, wherein:
    said gel includes 33.3% by weight of said gelling agent, 33.3% by weight of said resiliency component and 33.3% by weight of said softening agent.

8. A heat moldable composition in accordance with claim 1, wherein:
    said thermoplastic polymer is polycaprolactone.

9. A heat moldable composition in accordance with claim 3, wherein:
    said foam has a hardness less than or equal to said hardness of said gel;
    said gel includes 33.3% by weight of said gelling agent, 33.3% by weight of said resiliency component and 33.3% by weight of said softening agent;
    said gelling agent is polycaprolactone.

10. A process for making a heat moldable composition, the process comprising the steps of:
    combining a gelling agent, a resiliency component and a softening agent together to form a gel, said gelling agent being a thermoplastic polymer, said resiliency component being styrene-butadiene copolymer, and said softening agent being oil;
    providing a solid foam having a plurality of cells, said plurality of cells being at least partially hollow, said foam having a hardness greater than 16 on a Type "OO" scale durometer and less than 45 on a Type "A" scale durometer;
    infusing said gel into said foam to arrange said gel inside said plurality of cells to form the composition;
    choosing said foam, said gelling agent, said resiliency component and said softening agent to be of a type and to be of a quantity to cause the composition to have a hardness greater than 16 on a Type "OO" scale durometer and less than 45 on a Type "A" scale durometer and to soften to a hardness of less than 2 on a Type "OO" scale durometer at 50 degree C.

11. A process in accordance with claim 10, wherein:
said infusing is performed by arranging said gel over said foam, and heating said gel and said foam to cause said gel to be absorbed by said foam.

12. A process in accordance with claim 10, wherein:
said infusing is performed by arranging said gel between two layers of said foam to form a sandwich type arrangement, said infusing then compressing said sandwich type arrangement by rolling between two rollers to force said gel into said foam.

13. A process in accordance with claim 12, wherein:
said infusing includes heating the sandwich type arrangement.

14. A process in accordance with claim 13, wherein:
said heating includes heating the two rollers.

15. A process in accordance with claim 13, wherein:
said heating of the sandwich type arrangement is caused by friction from the rollers.

16. A process in accordance with claim 10, wherein:
said infusing is performed by using pressure to force said gel inside said plurality of cells.

17. A process in accordance with claim 10, wherein:
said infusing is performed by;
arranging said gel between two layers of said foam to form a sandwich type arrangement,
placing said sandwich type arrangement in a product to receive padding,
applying pressure to said sandwich type arrangement in the product to infuse the gel into the foam and shape the resulting gel and foam composition.

18. A heat moldable padding device comprising:
a solid foam structure deformable into a plurality of shapes, said solid foam structure having a plurality of cells, said plurality of cells being at least partially hollow, said foam structure having a hardness greater than 16 on a Type "OO" scale durometer and less than 45 on a Type "A" scale durometer;
a gelling agent for imparting rigidity to said composition, said gelling agent being a thermoplastic polymer;
a resiliency component for imparting rubber-like resilient characteristics to said composition, said resiliency component being styrene-butadiene copolymer;
a softening agent for controlling flowability of said composition, said softening agent being oil;
said gelling agent, said resiliency component and said softening agent being mixed together to form a gel, said gel being arranged inside said plurality of cells of said foam structure to form the padding device;
said foam structure, said gelling agent, said resiliency component and said softening agent being chosen to be of a type, and to be of a quantity, to cause the padding device to have a hardness greater than 16 on a Type "OO" scale durometer and less than 45 on a Type "A" scale durometer and to soften to a hardness of less than 2 on a Type "OO" scale durometer at a temperature of 50 degree C.

19. A heat moldable padding device in accordance with claim 18, wherein:
said foam structure is a carrier and support structure for said gel;
said foam structure is an open cell foam with a cell size greater than or equal to 100 microns, and less than or equal to ¼ of an inch.

20. A heat moldable padding device in accordance with claim 18, wherein:
said plurality of cells of said foam structure form a housing for said gel;
said foam structure is a closed cell foam with a cell size greater than or equal to ¹⁄₆₄th of an inch, and less than or equal to ½ of an inch, said foam structure being perforated with holes of a size greater than or equal to ¹⁄₆₄th of an inch, and less than or equal to ½ of an inch.

21. A heat moldable padding device in accordance with claim 18, wherein:
said gelling agent, said resiliency component and said softening agent are chosen to be of a type and to be of a quantity to cause the padding device to have a hardness greater than 16 on a Type "OO" scale durometer and less than 45 on a Type "A" scale durometer and can be softened to a hardness of less than 2 on a Type "OO" scale durometer by heating to a temperature of 50 degree C.;
said foam structure has a hardness less than or equal to said hardness of said gel;
said gel includes 33.3% by weight of said gelling agent, 33.3% by weight of said resiliency component and 33.3% by weight of said softening agent;
said thermoplastic polymer is polycaprolactone.

* * * * *